3,521,412
METHOD OF HONING BY EXTRUDING
Ralph William McCarty, Monroeville, Pa., assignor to Extrude Hone, Inc., Irwin, Pa., a corporation of Pennsylvania
Continuation-in-part of application Ser. No. 506,472, Nov. 5, 1965. This application Apr. 12, 1968, Ser. No. 720,913
Int. Cl. B24b 1/00, 19/00
U.S. Cl. 51—317        7 Claims

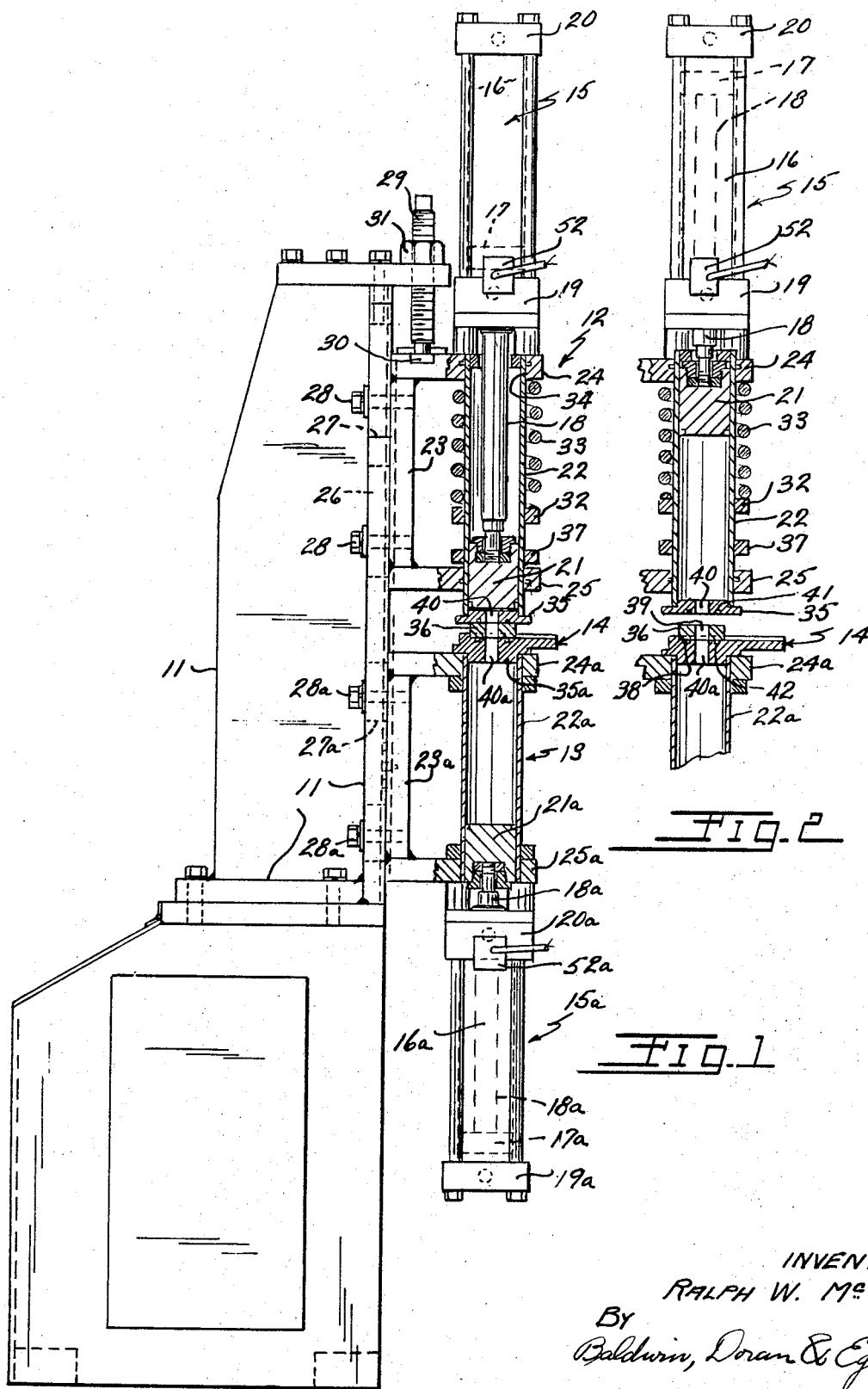

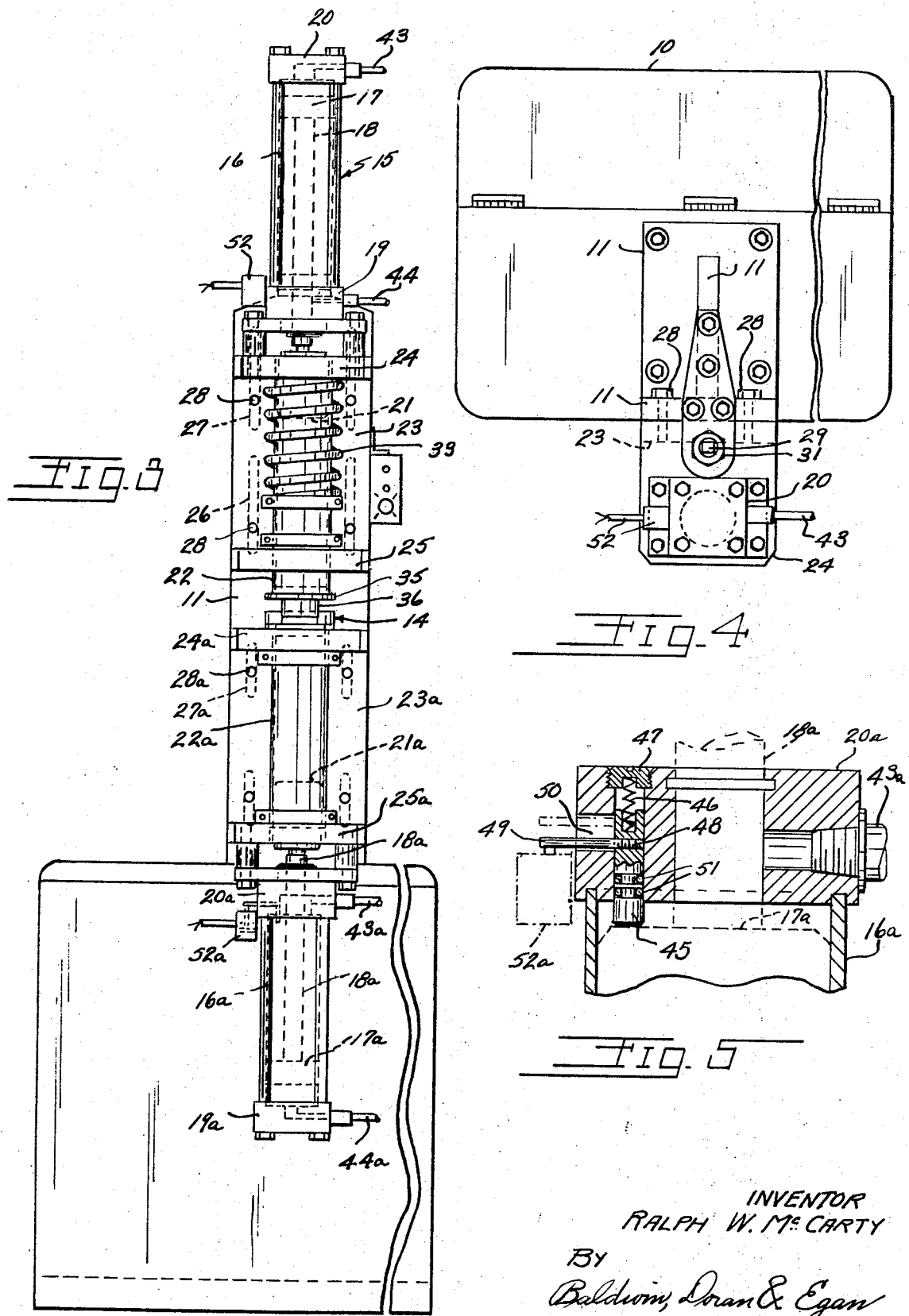

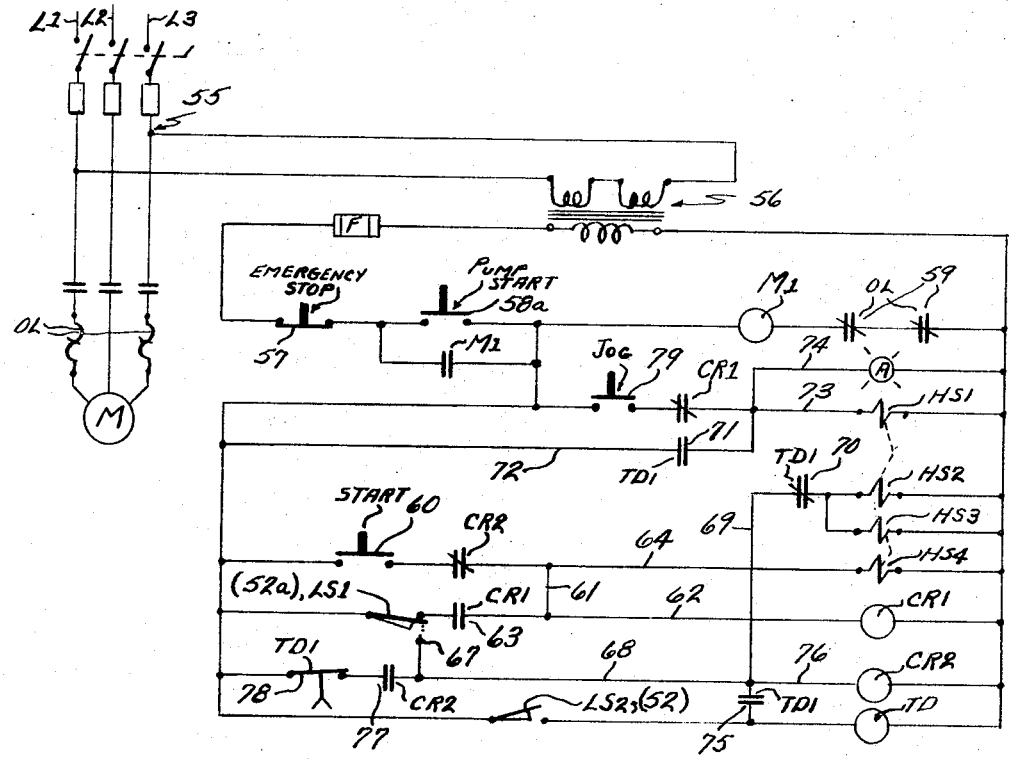
Fig. 6
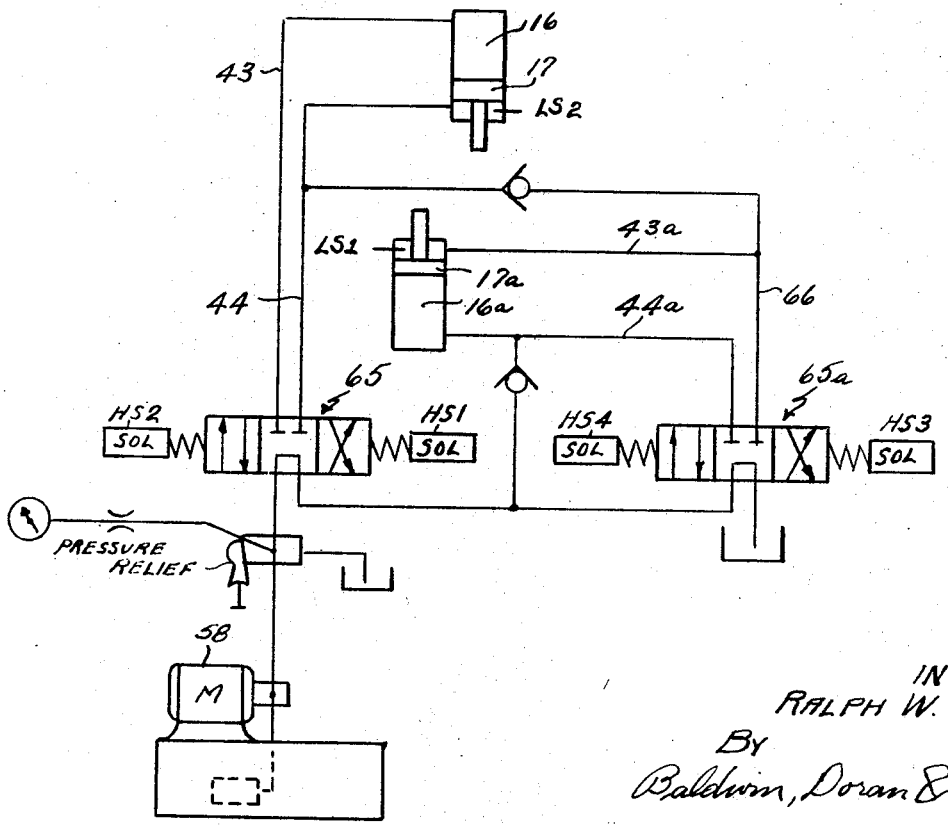
INVENTOR
RALPH W. McCARTY
BY
Baldwin, Doran & Egan
ATTORNEYS

United States Patent Office 3,521,412
Patented July 21, 1970

ABSTRACT OF THE DISCLOSURE

An abrasive medium is described consisting of finely divided abrasive particles uniformly distributed in a semi-solid, difficultly flowable plastic material of the consistency of putty and which forms a substantially solid matrix in carrying out the method of this invention. Representatives of such plastic material are silicone putty or silicone rubber and a non-vulcanized plastic rubber putty. The method disclosed provides a means for abrading an internal surface otherwise very difficult of access, such a problem being disclosed in the matter of deburring the edges involved where two bores cross each other internally of a metal block. One form of apparatus for carrying out the method is disclosed.

---

This application is a continuation-in-part of my co-pending application Ser. No. 506,472, filed Nov. 5, 1965, now abandoned.

This invention relates to improvements in method of honing or abrading by extruding. The invention relates to honing or abrading a surface comprising steps of passing over the surface to be finished in abrasive contact therewith, a semi-solid, difficultly flowable plastic material of the consistency of putty permeated with finely divided abrasive particles while holding the plastic material confined in pressure contact with the surface to be finished. The special value of this invention is believed to be in the removal of burrs, breaking corners, and improving the finish of the interior of surfaces of intricately shaped products.

The design of many products necessitates the machining of intersecting bores, flats, slots, keyways and splines, and the machining of these various shapes invariably produces a sharp corner or a raised burr at the conjunction of such surfaces. This invention is particularly useful where such intersecting surfaces occur in the internal part of a workpiece which cannot be finished by the usual methods of grinding, lapping or the usual known kinds of honing.

The end use of many products in the aeromotive, aircraft and aero-space industries is such that a small particle of metal may cause failure to the entire engine or other operating system. The flaking off of a projecting burr, therefore, is a risk that is always present in the assembly of these products. Again, the sharp corner resulting from the above-mentioned machining operations, may be a point of stress concentration and possible failure of a critical part. The blending of the sharp corners with a radius materially reduces this stress concentration.

In detail, the purpose of this process includes the following:

(a) To provide a means of removing burrs from the interior and exterior surfaces of various products;

(b) To improve the surface finish of surfaces produced by various machining operations better than, or which cannot be improved by, conventional methods;

(c) To provide a means of adding a radius or a blending of sharp corners of the product;

(d) To provide a means of finishing the inside diameter of straight bored products to exceptionally fine finish;

(e) To improve surface finish quality in non-symmetrical or otherwise inaccessible cavities, galleries or manifolds; and (f) To provide a means of automatically or semi-automatically performing these operations, with a controlled cycle, eliminating the operator variable and its resultant high cost and low quality.

This invention is an improvement over commonly used methods of finishing parts in use today. The most commonly used method is manual, utilizing files, rotary burr tools or stones. Such manual operations are not satisfactory in that the location of the surface requiring burr removal may be so inaccessible that satisfactory quality levels cannot be attained, or may require such a degree of physical dexterity that only a few can perform the operation properly. This results in poor quality and a high percentage of scrap. Furthermore, manual operations are difficult to control and are usually erratic in cost per piece. They also increase inspection costs because of the erratic performance.

Another known method is vaporblasting which incorporates an abrasive slurry which is forced against the product at relatively high velocity. The impingement of the abrasive particles on the surface of the product erodes or abrades away the surface. This process has almost no effect on surfaces located interiorly of the product.

Sandblasting involves the use of abrasive particles thrown at high speed by compressed air or a mechanical flinger. Here again, this application has no value for interior surfaces.

Shotblasting uses cast iron shot, steel shot, or glass beads at high velocities as in the case of sandblasting. This operation is more nearly a peening over of the burr rather than a clean removal.

Tumbling agitates the product in a mixture of abrasive particles, stones, or jacks. These processes are carried out at low pressure and low velocity. The more exposed surfaces receive the most action. Here again, interior surfaces receive little or no abrasive effect.

The present invention incorporates the use of a plastic or semi-solid medium containing abrasive particles distributed substantially uniformly throughout. The purpose of the semi-solid medium is to transport the abrasive particles through the product being deburred in order to permit the abrasive particles to remove the upraised metal and to round the corners as it passes.

Another purpose of the semi-solid medium is to hold the abrasive particles in suspension so that they will be pressed firmly against the surface of the product when the medium passes through the openings as taught hereinafter, so that the abrasive effect is at a maximum, and uniformly distributed over the surface treated.

Another purpose of the semi-solid medium is to provide a relatively firm backing for the abrasive, when the medium is under pressure, in order to increase the cutting action of the abrasive against the surface being treated, while still being plastic enough to flow through the product in order to reach all required surfaces.

It should be noted that a liquid slurry carrying abrasive material and pumped through the same kind of workpiece as treated by this invention would not have the required abrasive action nor would it strike all surfaces uniformly. Such liquid slurry would require high velocity of flow to provide maximum impingement of the abrasiv particles against the surface treated. Under such conditions some areas would receive no abrasion at all.

Some differences between the medium used for abrasive action in this invention and those employing abrasive carried by a liquid or air or gaseous medium should be noted. In the present invention the medium used is a semi-solid, forced through the product under pressure and with relatively low velocity in such a manner as to provide a maximum abrasive action and uniformity of finish. Processes using liquid or air as a medium rely on high velocity and low pressure. The semi-solid, difficultly flowable medium of this invention provides a firm matrix or support for the abrasive particle as it passes over the surface treated. Other processes using liquid or air as a medium or vehicle rely on high velocity and impingement of the abrasive particle against the workpiece. Sharp corners requiring blending usually occur at a conjunction of two surfaces. Flow through or past the product, therefore, changes direction at these points. A change of direction of flow of the present semi-solid, difficultly flowable medium, tends to increase the abrasive action of the medium in the present process at such conjunction of surfaces. A liquid or air medium, on the other hand, carrying abrasive particles, will tend toward reduced abrasive action at these points of change of direction, and, under high velocity, the turbulent flow used with such liquid and air mediums tends to create areas of no particle motion, at points of changing direction, resulting in no abrasive action at these points.

In the drawings,

FIG. 1 is a central sectional view through one embodiment of this invention, the same being taken generally along the centerline of the cylinders of FIG. 3;

FIG. 2 is a fragmental view similar to the upper portion of FIG. 1 and showing another position of the parts;

FIG. 3 is a front plan view of the machine taken from the right-hand side of FIG. 1;

FIG. 4 is a top plan view of the same;

FIG. 5 is an enlarged fragmental sectional view taken near one end of one of the hydraulic cylinders shown in FIGS. 1, 2 and 3; while FIG. 6 is a diagrammatic view showing a control for the machine illustrated.

This invention will be described using a closed reciprocating system wherein the honing medium is passed back and forth through a workpiece to finish the same. It will be described using cylinder and piston motors but those familiar with the extruding of plastic material will understand that the force might be otherwise applied to move semi-solid plastic honing medium, such as a rotating screw or the like. Using a rotating screw, it is obvious that the honing medium might be passed in one direction only through the workpiece being treated and the honing medium might later be returned to the circulating or pressure device. This type of arrangement would be valuable in processing parts where certain advantages accrue by providing a single direction of flow. Such conditions might be, for instance, shoulders, faces or other areas which must not be affected by the honing process, or sharp corners of parts which must not be reduced.

Referring to FIGS. 1, 3 and 4 of the drawings, a base housing 10 is provided with an upstanding frame 11 for supporting the mechanism about to be described. The housing 10 may provide a hollow chamber for various control equipment but this feature has nothing to do with the present invention. Mounted on frame 11 are an upper plastic extruding device 12 and a lower plastic extruding device 13 and between them a workpiece holder 14. With one exception which will be later noted, the devices 12 and 13 are identical and one only will be described with reference numerals for the other being given a suffix "a." The device 12 comprises a double acting cylinder and piston motor 15 having a cylinder 16 in which is reciprocatable a piston 17 which operates a piston rod 18 which extends outwardly through a cylinder head 19 for a purpose to be described. The other end of the cylinder is closed with a cylinder head 20. The piston rod 18, below the cylinder head 19, is provided with a plunger 21 snugly fitting in a plastic material cylinder 22. The aligned cylinders 12 and 22 are carried in a generally C-shape bracket 23 having arms 24 and 25 which embrace the cylinders. The bracket 23 has an extension 26 which extends into an elongated slot 27 in the frame 11 so that bracket 23 may be adjusted vertically for handling different size workpieces. It is held in position by suitable bolts 28. A fine adjustment is provided by means of threaded screw 29 carrying a rotatable head 30 in a suitable pocket in the upper arm 24 of the bracket. This position is locked by means of a nut 31. In like manner, the aligned cylinders 16a and 22a are mounted in bracket 23a which is also vertically adjustable in frame 11 and held in position by the bolts 28a.

The chief difference between the upper pair of cylinders and the lower pair of cylinders resides in an arrangement whereby cylinder 22 is enabled to clamp a workpiece in the work holder 14. It is obvious that other means for holding the workpiece might be provided so that this difference is not essential to the operation of the invention. It will be noted that there is a collar 32 fixed to the cylinder 22 and spaced above the lower end of that cylinder. Between this collar and the upper arm 24 of the bracket is held a helical compression spring 33 and the cylinder 22 is slidably mounted at 34 in the arm 24. It is thus possible, as later described, to cause the plunger 21 to move upwardly as shown in FIG. 2 sufficiently to engage the upper head of cylinder 22 and lift this cylinder slightly above the upper arm 24 while compressing the spring 33 sufficiently to cause the lower cylinder head 35 to release a workpiece 36 resting on the work holder 14. A second collar 37 on cylinder 22 prevents excessive extension of spring 33 in case no workpiece is below the head 35.

It will be noted that there is no spring 33 associated with the lower cylinder and this cylinder is fixed in the supporting arm 24a. The cylinder is closed at its upper end with a cylinder head 35a which is here shown as integrally formed with the work holder 14 although it is obvious these two parts perform two functions and might be separate pieces properly secured to each other so as to position a workpiece 36 in proper position for this process.

The work holder in this form of device has a shoulder 38 against which the workpiece 36 is firmly positioned and in this embodiment of the invention a central opening or passage 39 in the workpiece 36 is aligned with a combined inlet and discharge opening 40 of cylinder 22 and a similar opening 40a of cylinder 22a. It will be noted that O-rings are provided above the workpiece at 41 and below the workpiece at 42 to prevent leakage at this point during operation of the process described herein.

Means is provided for supplying hydraulic fluid under pressure to and from each end of motor 15 by conduit 43 in cylinder head 20, conduit 44 in cylinder head 19, and conduits 43a and 44a in cylinder heads 20a and 19a, respectively.

In the control hereinafter described, it is desirable to have a switch actuated at the end of travel of piston 17 downwardly or piston 17a upwardly. A novel arrangement for actuating such a switch is shown in FIG. 5. This is described in connection with cylinder 16a but identical structure is shown at the upper end of cylinder 16. In the cylinder head 20a a button 45 is mounted for reciprocation parallel to the axis of the cylinder. To this end, a bore is provided in the cylinder head and the button is formed on the end of a plunger which is normally urged outwardly by a spring 46 compressed between the lower end of the plunger and a recess in the cylinder head closed by screw 47. A cross bore 48 in the plunger carries a switch actuator pin 49 which extends outwardly beyond the cylinder head through an elongated slot 50 which permits travel of the pin to the dot-dash position as viewed in FIG. 5 when button 45 is depressed by an approaching piston such as 17a. The plunger carrying button 45 is sealed in its bore against leakage of hydraulic fluid by O-ring sealing means 51. In actual operation, normally open switch 52, connected with cylinder 16, and normally closed switch 52a, connected with cylinder 16a, are provided to be reversed by pin 49 when the associated piston reaches the end of its travel.

The medium for use in this invention is a semi-solid, difficultly flowable plastic material having the consistency of putty and uniformly permeated with finely divided abrasive particles. It is necessary to the operation of this invention that the plastic carrier have sufficient body at high pressure and low velocity to press the abrasive particles against the surface to be treated with sufficient force to produce the result desired. One suitable vehicle for carrying the abrasive particles is silicone putty, sometimes called silicone rubber, in the grade indicated by General Electric Company as SS–91. This material has a bounce or rebound of 25 to 50 percent when a twelve gram ball of the putty at 70 to 78 degrees F. is dropped from a height of 100 inches onto a smooth surfaced soapstone block. The material has a resilience of 10 percent to 20 percent when measured with a Bashore Resiliometer of the Precision Scientific Company of Chicago, at room temperature and with a special one-half ounce drop weight. The same putty has a penetration of 1.5 to 10 mm. in five seconds using a Precision Universal Penetrometer with a one-quarter inch diameter foot on a 47.5 gram test rod with no external loading. This test is made at least twenty-four hours after the batch of putty is dropped or first formed in order to get a reliable test.

By definition, silicone putty, or silicone rubber, is a solid. However, it exhibits many of the characteristics of a fluid. It is compressible, and therefore expandable. Under pressure it becomes less flowable and more like a solid. It conforms exactly to the shape of whatever confines it and this insures 100 percent abrasion on all parts or corners that the putty mixture is compressed against or forced through.

For most uses, a small amount of plasticizer or softener is used with the above-mentioned putty to render it slightly more plastic and flowable than in its original form. One mixture successfully used comprises:

EXAMPLE I

| | Percent |
|---|---|
| G.E. silicone putty, SS–91 grade | 35 |
| Isopropyl stearate (softener) | 3 |
| Silicone grease (adds lubricity) | 2 |
| Silicon carbide abrasive #120 grade | 60 |

In jobs requiring somewhat greater flowability, the isopropyl stearate or other suitable softener would be slightly increased.

EXAMPLE II

| | |
|---|---|
| Silicone putty | pounds__ 1 |
| Aluminum oxide (100 grain size) | do____ 6 |
| Methyl phenyl silicone fluid, 125 centistoke, produced by the General Electric Co. | ounces__ 1 |
| Tetrafluoroethylene powder | do____ 2 |

Another difficultly flowable plastic material which is a suitable medium for carrying the finely divided abrasive material of this invention is a non-vulcanized plastic rubber putty sold by the Eberhard-Faber Company under the trade name Kneaded Rubber. Both this material, and the silicone putty, may be used for tough jobs where the putty material has substantially the consistency of glazing putty after it has stood in a can for some time so that most of the oil has separated out to the top of the material. However, for easier jobs or those jobs where the passageways to be traversed by the medium of this invention are small in cross section, the basic putty material of this invention works better if it is plasticized or softened somewhat by working into it a small amount of methyl phenyl silicone fluid, 125 centistoke, produced by the General Electric Company, oleic acid, isopropyl palmitate, or isopropyl stearate. Other softeners might be substituted for those mentioned herein. In any case, the basic plastic putty material is seldom reduced to a point where it is softer than a glazier's putty as he applies it around the edge of a window pane.

Another additive to the basic plastic putty material will be referred to herein as a "hardener." Small additions of this ingredient will result in a stiffening or toughening of the vehicle medium. This hardener will cause the plastic putty material to retain a certain compactness to better press the abrasive against the burr to be removed. This hardener will also act as an internal lubricant, that is, within the medium when there is evidence of plugging or blockage. Suitable hardeners are tetrafluoroethylene, commonly known as Teflon, in the form of small beads or powder and levigated talc.

The additives, such as the reducers and hardeners mentioned above, are usually used in combination. Should it be desired to increase the flowability of the abrading and honing medium, then the reducer should be added. Should it be deemed desirable to toughen the batch, an ounce of hardener may require three or four ounces of reducer to complete the conditioning. Again, if a batch is softened by using the reducer, a quarter ounce of the hardener will show a response in retaining compactness. The amounts refer to one pound of the putty material as a base.

EXAMPLE III

| | |
|---|---|
| Kneaded Rubber | pounds__ 1 |
| Aluminum oxide (100 grains size) | do____ 4 |
| Silicone fluid | ounces__ 3 |
| Teflon powder | do____ 1 |

Obviously, the abrasive used in the carrier putty will be varied to suit the job. A satisfactory abrasive for use in working on steel is boron carbide ($B_4C$) which is readily obtainable from Norton Company in standard grit size. An abrasive for many applications is aluminum oxide. Other abrasives might include diamond dust, silicon carbide, rouge, corrundum, garnet, alundum, glass, or in some unusual operations softer material such as fiber or shell material. Commonly, the abrasive per pound of putty material will weigh from about two pounds to about fifteen pounds.

In operation of the apparatus described, with a workpiece clamped between the two cylinder pairs as shown in FIG. 1, and with piston 17 and plunger 21 in uppermost position and piston 17a and 21a in lowermost position, the cylinder 22a is filled with the silicone putty carrier permeated with a suitable abrasive as above described. In one form of the invention, cylinders 22 and 22a are slightly less than three inches in diameter and about ten inches long and one of them will hold about three pounds of the putty and abrasive mixture. Motor 15a is then actuated to drive piston 17a and plunger 21a upwardly thus forcing the honing material through the passageway 39 in the workpiece 36 and up into the cylinder 22. When piston 17a reaches the upper end of its travel, it hits a button 45 as described in connection with FIG. 5 and causes actuation of switch 52a. This reverses the flow of hydraulic fluid through conduits 43a and 44a in a direction to drive piston 17a downwardly. At the same time it supplies hydraulic fluid to motor 15 so as to drive piston 17 and plunger 21 downwardly. This causes reverse flow of the honing material through the passageway 39 of the workpiece and again redeposits the honing material in the lower cylinder 22a. When piston 17 reaches the lower limit of its travel, it hits its associated button 45 and actuates switch 52 to start a timer and to reverse the hydraulic flow so as to enter at 44 and exit at 43 driving piston 17 upwardly until the timer stops this action. Preferably, this action is set to move cylinder 22 to the position shown in FIG. 2 so as to compress spring 33 and release the workpiece 36 from the clamping action so that it may be removed and a new workpiece put in its place. The timer preferably is arranged to hold cylinder 22 in the position of FIG. 2 for a few seconds to enable the positioning of a new workpiece in work holder 14. Then, when the timer times out, the pressure under piston 17 is released and spring 33 causes cylinder head 35 to clamp the new workpiece. FIG. 6 shows a diagram of a control for carrying out the above cycle.

The diagram of FIG. 6 indicates a power source 55, a transformer 56, an emergency stop button 57, a pump start button 58a for motor pump 58, a circuit holding relay M1, and overload relays 59. Closing button 58a starts the motorized pump 58 to supply hydraulic fluid under pressure in the fluid control system shown in the lower half of FIG. 6. In starting the operation of the machine, after the workpiece is suitably positioned as shown in FIGS. 1 and 2, start button 60 is closed which through normally closed control relay CR2 and lines 61 and 62 energizes control relay CR1 which closes contacts 63 to provide a holding circuit. Through line 64 hydraulic solenoid HS4 is energized which moves valve 65a toward the right causing pressure fluid to be supplied through line 44a beneath piston 17a driving this piston upwardly while the hydraulic fluid is discharged through lines 43a and 66 back to the pump reservoir. This drives the flowable plastic honing material upwardly from cylinder 22a through the workpiece and into cylinder 22, the piston 17 of which is at this time in the uppermost position as will later appear. When piston 17a reaches the end of its travel, it strikes button 45 so as to cause rod 49 to reverse the position of the normally closed limit switch 1 or 52a. This de-energizes solenoid HS4 and control relay CR1. In its reversed position, limit switch LS1 engages contact 67 and, through line 68, energizes control relay 2 shown on the diagram as control relay CR2. At the same time, through line 69, solenoids HS2 and HS3 are energized so as to deliver hydraulic pressure fluid through line 43 to the upper portion of the cylinder 16 driving piston 17 downwardly while discharging hydraulic fluid through line 44 back to the reservoir. Solenoid HS3 causes pressure fluid to be delivered through line 66 and line 43 to the upper end of cylinder 16a driving piston 17a downwardly while pressure fluid is discharged through line 44a to reservoir. When piston 17 in the upper cylinder reaches the lower end of its travel, through button 45, limit switch LS2 or switch 52 which is normally open is reversed and moved to closed position which energizes the time delay relay TD. This opens the normally closed contact 70 thus deenergizing solenoids HS2 and HS3. It also closes contacts 71 in line 72 which energizes solenoid HS1 through line 73 and a pilot light A in line 74. Energization of the time delay relay TD closes the normally open contacts at 75 so as to energize control relay CR2 through line 76 and this closes the normally open contacts 77 as long as the time delay switch 78 remains closed by the timing element. The energization of solenoid HS1 delivers pressure fluid through line 44 to the lower end of cylinder 16 driving piston 17 upward while pressure fluid discharges through line 43. The time delay is so adjusted that cylinder 22 is raised to the position indicated in FIG. 2 so that the lower cylinder head releases the workpiece 39 so that it may be removed and changed. So long as the light A remains lit, the operator knows that he has time to reinsert another workpiece. Upon the opening of the time delay switch 78, solenoid HS1 is de-energized and cylinder 22 will move downwardly toward clamping position. If a new workpiece has not been inserted in the work holder 14 at this time, it is only necessary to close the jog switch 79 which will energize solenoid HS1 causing the cylinder 22 to move upwardly so that one may insert a fresh workpiece. The parts are now in position for a new cycle.

It is obvious that the above cycle could be controlled manually or it might well be made automatic by merely having the machine operate the start button automatically when the new work is clamped in position.

A machine operating as above described and utilizing the typical batch of honing medium hereinabove defined using the silicone putty with the isopropyl stearate softener developed 1500 pounds per square inch in the hydraulic pump and expelled the honing medium from the cylinders at the rate of about ¾ inch per second. The passageway 39 through the workpiece in this example caused a restriction of the flow so that the flow was accelerated to about thirty inches per second. In this case, one pass of the honing medium upwardly and then downwardly removed the typical grinding burrs and produced a uniform radius condition on all affected edges of 0.002 inch to 0.005 inch. The surface finish on the treated surfaces was of the order of 4 to 8 R.M.S. and this is the more predictable if the abrasive grit is of substantially uniform size in a given honing medium for a given purpose. Pressure on the honing medium is seldom less than 500 p.s.i.

It is necessary to hold the workpiece between the upper and lower pairs of cylinders so as to confine the flow of the honing medium past the area to be treated. In the case of an opening through the workpiece, special adapters may be called for to pass the honing medium into a certain opening and out of a certain opening in the workpiece. This is merely the skill of the industry.

This invention may be utilized to hone or abrade machined parts, die castings, forgings, sand castings, investment castings and extruded shapes. It is applicable to all materials such as steel, aluminum, brass, bronze, plastics, glass and other compositions and materials as needed.

It should be noted that the silicone putty is particularly useful in this process as it is well known that this material becomes harder when subjected to additional pressure such as when turning a corner or being forced through a restricted passageway as in the honing processes herein described.

In general, the tougher jobs take the thickest plastic putty material and the largest abrasive size. The easier jobs take the thinner putty material and a smaller abrasive size down to as small as 6 to 10 microns.

The major ingredient, in the honing medium of this invention, is the abrasive grain employed. The amount will usually vary from about 2 to 4 pounds of abrasive particles in the smaller size per pound of the putty material, up to as much as 12 or 15 pounds of abrasive particles in the larger grain sizes per pound of the plastic putty material.

The honing medium of this invention, which acts as a surface abrading tool, is unique for the reason that the abrasive grain is held or contained in a random repositioning arrangement in a plastic matrix. The usual concept is that of an abrasive "stone" or lap wherein the grain particle is fixed and presents one cutting point or edge which is maintained until dulling causes removal by means of a dressing operation. The total grain particles in use in the process of this invention are sharp until the sum of all points or edges have been exposed many times. The internal shearing which occurs when in use results in a continuous resharpening which extends the life of the medium to many hundreds of hours. The abrasive medium used in this invention may be defined as "rheopectic" in that its apparent viscosity increases as the shear rate.

The finishing method of this invention may be described as "soft" in that there is no instant of great energy expended. The finished pattern, while directional, is not consistent. The finish mark caused by any grain particle cannot be traced beyond the instant of contact and the opportunities for random repositioning and recontact are all but limitless.

The fastest cutting action, which is also consistent with the most uniform results, occurs when the media exhibits an oily non-adhering contact with the workpiece. It would appear that when in this condition the media has the greatest opportunity to pass through the part at a constant cross sectional pace. This is contrary to a fluid flow which is greatest through the center and supposedly "zero" along the wall.

What is claimed is:

1. The method of abrading an internal surface comprising compressively pushing over the surface to be abraded in abrasive contact therewith a semi-solid, difficultly flowable plastic material of the consistency of putty chosen from the group consisting of silicone putty and non-vulcanized plastic rubber putty permeated with finely divided abrasive particles which material becomes a flowable almost solid slug under pressure forming a firm matrix holding said plastic material confined in abrasive pressure contact with said surface.

2. The method of claim 1 wherein said plastic material is silicone putty having the approximate qualities of (1) bounce 25 to 50 percent of original drop, (2) resilience 10 to 20 percent on Bashore Resiliometer, and (3) penetration 1.5 mm. to 10 mm. in 5 seconds by Precision Universal Penetrometer using ¼ inch diameter foot and 47.5 gram weight on foot surface.

3. The method of claim 1 wherein the pressure on said plastic material in contact with said surface is approximately 500 to 1500 pounds per square inch.

4. The method of claim 1 wherein said plastic material is plasticized by adding a small amount of a reducer chosen from the group consisting of silicone fluid, oleic acid, isopropyl palmitate, and isopropyl stearate, while retaining the semi-solid character of the plastic material.

5. The method of claim 1 wherein said plastic material is stiffened by adding a small amount of a hardening agent chosen from the group consisting of tetrafluoroethylene beads, tetrafluoroethylene powder, and levigated talc, while retaining the semi-solid character of the plastic material.

6. The method of claim 1 wherein the weight of said finely divided abrasive particles is between about two times to about fifteen times the weight of said plastic material.

7. The method of claim 1 wherein said abrasive particles are chosen from the group consisting of aluminum oxide, diamond dust, silicon carbide and boron carbide.

References Cited

UNITED STATES PATENTS

| 2,346,228 | 4/1944 | Merrill et al. | 51—317 X |
| 2,425,640 | 8/1947 | Pruit et al. | 51—7 |
| 2,497,021 | 2/1950 | Sterns | 51—317 X |
| 2,589,782 | 3/1952 | Greek | 51—19 |
| 2,880,554 | 4/1959 | Simjian | 51—7 |

FOREIGN PATENTS

| 13,834 | 7/1893 | Great Britain. |

LESTER M. SWINGLE, Primary Examiner

U.S. Cl. X.R.

51—7, 299

REEXAMINATION CERTIFICATE (83rd)

United States Patent [19]
McCarty

[11] B1 3,521,412
[45] Certificate Issued May 17, 1983

[54] METHOD OF HONING BY EXTRUDING

[75] Inventor: Ralph William McCarty, Monroeville, Pa.

[73] Assignee: Extrude Hone, Inc., Irwin, Pa.

Reexamination Request
No. 90/000,058, Aug. 20, 1981

Reexamination Certificate for:
Patent No.: 3,521,412
Issued: Jul. 21, 1970
Appl. No.: 720,913
Filed: Apr. 12, 1968

Related U.S. Application Data

[63] Continuation-in-part of application Ser. No. 506,472, Nov. 5, 1965.

[51] Int. Cl.³... B24B 1/00, B24B 19/00, C08C 11/04
[52] U.S. Cl. .................... 51/317, 51/7, 51/299
[58] Field of Search .................. 51/7, 8, 17, 18, 19, 308, 51/299, 317, 318, 328

[56]  References Cited

U.S. PATENT DOCUMENTS

| | | |
|---|---|---|
| 2,346,228 | 4/1944 | Merrill et al. |
| 2,419,687 | 4/1947 | Luckey. |
| 2,425,640 | 8/1947 | Pruit et al. |
| 2,497,021 | 2/1950 | Sterns. |
| 2,589,782 | 3/1952 | Greck. |
| 2,880,554 | 4/1959 | Simjiam. |
| 3,039,234 | 6/1962 | Balman. |

FOREIGN PATENT DOCUMENTS 13834  1893  United Kingdom.

OTHER PUBLICATIONS

Tooling and Production, Article, p. 54t, "Machine with Putty?—Silly Putty??" by McCarty, dated February 1966.

SS-91 Silicone Putty technical publication by G.E., dated Jul. 1959.

*Primary Examiner*—Harold D. Whitehead

[57]  ABSTRACT

An abrasive medium is described consisting of finely divided abrasive particles uniformly distributed in a semisolid, difficultly flowable plastic material of the consistency of putty and which forms a substantially solid matrix in carrying out the method of this invention. Representatives of such plastic material are silicone putty or silicone rubber and a non-vulcanized plastic rubber putty. The method disclosed provides a means for abrading an internal surface otherwise very difficult of access, such a problem being disclosed in the matter of deburring the edges involved where two bores cross each other internally of a metal block. One form of apparatus for carrying out the method is disclosed.

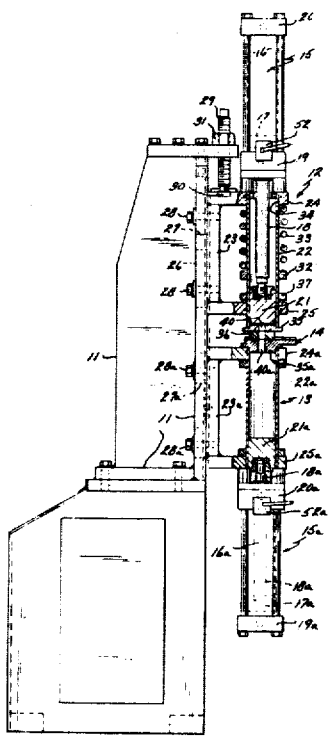

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended:

1. The method of abrading an internal surface comprising compressively pushing over the surface to be abraded in abrasive contact therewith a semi-solid, difficultly flowable plastic material [of the consistency of putty chosen from the group] consisting of silicone putty [and non-vulcanized plastic rubber putty] permeated with finely divided abrasive particles which material becomes a flowable almost solid slug under pressure forming a firm matrix holding said plastic material confined in abrasive pressure contact with said surface.

Claims 2–7, dependent on amended claims, are determined to be patentable.

* * * * *